(12) United States Patent
Katoh et al.

(10) Patent No.: US 11,738,714 B2
(45) Date of Patent: Aug. 29, 2023

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventors: Tatsunori Katoh, Nagoya (JP); Hiroyasu Hadano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/677,245

(22) Filed: Feb. 22, 2022

(65) Prior Publication Data

US 2022/0266797 A1 Aug. 25, 2022

(30) Foreign Application Priority Data

Feb. 24, 2021 (JP) .................................. 2021-027146

(51) Int. Cl.
 *B60R 25/24* (2013.01)
 *G07C 9/00* (2020.01)

(52) U.S. Cl.
 CPC .......... *B60R 25/24* (2013.01); *G07C 9/00309* (2013.01); *B60R 2325/20* (2013.01); *G07C 2009/00531* (2013.01); *G07C 2009/00555* (2013.01); *G07C 2009/00793* (2013.01); *G07C 2209/63* (2013.01)

(58) Field of Classification Search
 CPC . B60R 25/24; B60R 2325/20; G07C 9/00309; G07C 2009/00531; G07C 2009/00555; G07C 2009/00793; G07C 2209/63
 See application file for complete search history.

(56) References Cited

U.S. PATENT DOCUMENTS

| | | | | |
|---|---|---|---|---|
| 2006/0091729 | A1* | 5/2006 | Kamiya | F02N 11/101 307/10.1 |
| 2007/0109093 | A1* | 5/2007 | Matsubara | G07C 9/00309 340/5.72 |
| 2014/0195124 | A1* | 7/2014 | Wellhoefer | B60D 1/24 701/99 |
| 2015/0298655 | A1* | 10/2015 | Monthel | B60R 25/04 701/2 |
| 2019/0202445 | A1* | 7/2019 | Lavoie | H04W 4/023 |
| 2021/0370868 | A1* | 12/2021 | Sakurada | B60R 25/40 |

FOREIGN PATENT DOCUMENTS

| | | |
|---|---|---|
| DE | 102016206938 A1 | 10/2017 |
| DE | 102016121737 A1 | 5/2018 |
| JP | 2005-262915 A | 9/2005 |

* cited by examiner

*Primary Examiner* — Thomas D Alunkal
(74) *Attorney, Agent, or Firm* — Sughrue Mion, PLLC

(57) ABSTRACT

An information processing apparatus including a control unit configured to acquire a distance between a vehicle and a user terminal based on position information of the vehicle and position information of the user terminal, and generate a command for setting or releasing a remote immobilizer function and a smart cancel function based on the distance between the vehicle and the user terminal. The remote immobilizer function is a function for remotely setting or releasing an immobilizer of the vehicle. The smart cancel function is a function for stopping radio waves transmitted from the vehicle for communication between the vehicle and a key of the vehicle.

9 Claims, 11 Drawing Sheets

FIG. 3
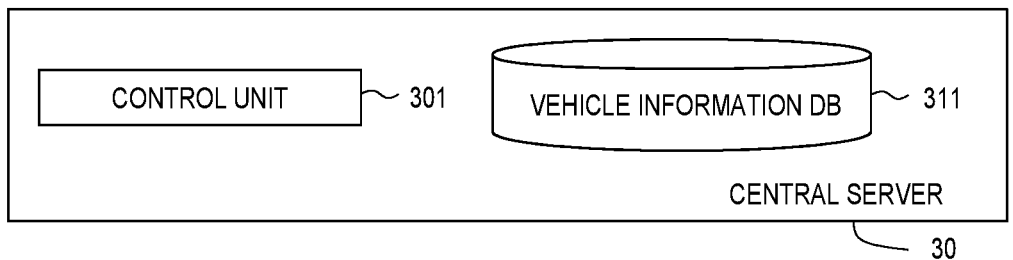
FIG. 4
| VEHICLE ID | USER TERMINAL ID | VEHICLE POSITION | USER TERMINAL POSITION | DISTANCE | SECURITY LEVEL |
|---|---|---|---|---|---|
| XXX | XXX | XXX | XXX | XXX | XXX |
| XXX | XXX | XXX | XXX | XXX | XXX |
| XXX | XXX | XXX | XXX | XXX | XXX |
| XXX | XXX | XXX | XXX | XXX | XXX |
FIG. 5
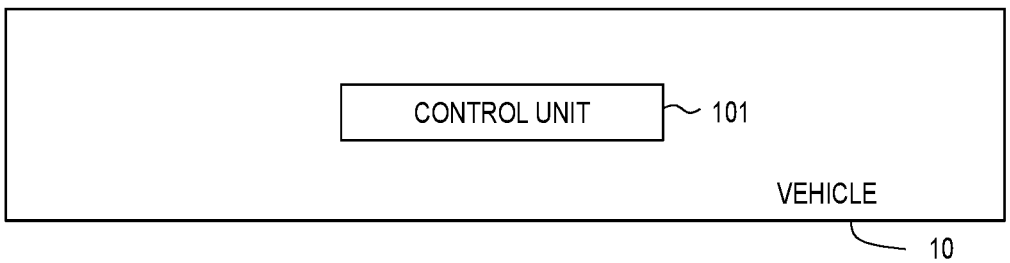

INFORMATION PROCESSING APPARATUS, INFORMATION PROCESSING METHOD, AND SYSTEM

CROSS-REFERENCE TO RELATED APPLICATION

This application claims priority to Japanese Patent Application No. 2021-027146 filed on Feb. 24, 2021, incorporated herein by reference in its entirety.

BACKGROUND

1. Technical Field

The present disclosure relates to an information processing apparatus, an information processing method, and a system.

2. Description of Related Art

A smart checking system that operates an in-vehicle device by wirelessly executing ID checking between a vehicle and a user terminal is known (see, for example, Japanese Unexamined Patent Application Publication No. 2005-262915).

SUMMARY

A fraudulent act (a so-called relay attack) in which radio waves sent from a vehicle are relayed by a relay or the like and reach a place far away from the vehicle has been regarded as a problem. The present disclosure prevents the vehicle from being stolen.

A first aspect of the present disclosure is an information processing apparatus including a control unit configured to acquire a distance between a vehicle and a user terminal based on position information of the vehicle and position information of the user terminal, and generate a command for setting or releasing a remote immobilizer function and a smart cancel function based on the distance between the vehicle and the user terminal. The remote immobilizer function is a function for remotely setting or releasing an immobilizer of the vehicle. The smart cancel function is a function for stopping radio waves transmitted from the vehicle for communication between the vehicle and a key of the vehicle.

In the first aspect, the control unit may be configured to, when the distance between the vehicle and the user terminal is equal to or longer than a predetermined distance, set the remote immobilizer function and the smart cancel function.

In the first aspect, the control unit may be configured to, when the distance between the vehicle and the user terminal is shorter than the predetermined distance, release the remote immobilizer function and the smart cancel function.

In the first aspect, the control unit may be configured to, when the distance between the vehicle and the user terminal is equal to or longer than a second predetermined distance and shorter than the predetermined distance, release the smart cancel function and set the remote immobilizer function.

In the first aspect, the control unit may be configured to, when the distance between the vehicle and the user terminal is shorter than the second predetermined distance, release the smart cancel function and the remote immobilizer function.

In the first aspect, the control unit may be configured, upon receiving a remote starting signal from the user terminal when the remote immobilizer function and the smart cancel function are set, to release the remote immobilizer function to activate the vehicle and not to release the smart cancel function. The remote starting signal is a command for activating the vehicle.

In the first aspect, the control unit may be configured to inquire of the user terminal as to whether to activate the vehicle when an operation for activating the vehicle is executed on the vehicle, and generate a command for activating the vehicle when there is a reply from the user terminal indicating that the vehicle is to be activated.

In the first aspect, the control unit may be configured to, when there is a predetermined input to the user terminal, generate the command for activating the vehicle.

A second aspect of the present disclosure is an information processing method executed by a computer. The information processing method includes a step of acquiring, by the computer, a distance between a vehicle and a user terminal based on position information of a vehicle and position information of a user terminal, and a step of generating, by the computer, a command for setting or releasing a remote immobilizer function and a smart cancel function based on the distance between the vehicle and the user terminal. The remote immobilizer function is a function for remotely setting or releasing an immobilizer of the vehicle. The smart cancel function is a function for stopping radio waves transmitted from the vehicle for communication between the vehicle and a key of the vehicle.

In the second aspect, the remote immobilizer function and the smart cancel function may be set by the computer when the distance between the vehicle and the user terminal is equal to or longer than the predetermined distance.

In the second aspect, the remote immobilizer function and the smart cancel function may be released by the computer when the distance between the vehicle and the user terminal is shorter than the predetermined distance.

In the second aspect, the smart cancel function may be released and the remote immobilizer function may be set by the computer when the distance between the vehicle and the user terminal is equal to or longer than the second predetermined distance and shorter than the predetermined distance.

In the second aspect, the smart cancel function and the remote immobilizer function may be released by the computer when the distance between the vehicle and the user terminal is shorter than the second predetermined distance.

In the second aspect, the remote immobilizer function may be released to activate the vehicle and the smart cancel function does not have to be released by the computer when the remote immobilizer function and the smart cancel function are set and a remote starting signal is received from the user terminal. The remote starting signal is a command for activating the vehicle.

In the second aspect, the user terminal may be inquired by the computer as to whether to start the vehicle when the operation for activating the vehicle is executed on the vehicle, and a command for activating the vehicle may be generated by the computer when there is a reply from the user terminal indicating that the vehicle is to be activated.

In the second aspect, the command for activating the vehicle may be generated by the computer when there is a predetermined input to the user terminal.

A system according to a third aspect of the present disclosure includes a vehicle configured to send position information, and a central server configured to send a command for setting or releasing a remote immobilizer function and a smart cancel function based on a distance between the vehicle and a user terminal. The remote immobilizer function is a function for remotely setting or releasing an immobilizer of the vehicle. The smart cancel function is a function for stopping radio waves transmitted from the vehicle for communication between the vehicle and a key of the vehicle.

In the third aspect, the central server may be configured to, when the distance between the vehicle and the user terminal is equal to or longer than a predetermined distance, set the remote immobilizer function and the smart cancel function.

In the third aspect, the central server may be configured to, when the distance between the vehicle and the user terminal is equal to or longer than a second predetermined distance and shorter than the predetermined distance, release the smart cancel function and set the remote immobilizer function.

In the third aspect, the central server may be configured to, when the distance between the vehicle and the user terminal is shorter than the second predetermined distance, release the smart cancel function and the remote immobilizer function.

Further, a fourth aspect of the present disclosure is a program for causing a computer to execute the information processing method or a non-transitory storage medium storing the program.

With each aspect of the present disclosure, it is possible to prevent a vehicle from being stolen.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a diagram exemplifying a functional configuration of the central server;

FIG. 4 is a diagram exemplifying a table configuration of vehicle information;

FIG. 5 is a diagram exemplifying a functional configuration of the vehicle;

DETAILED DESCRIPTION OF EMBODIMENTS

Figure 1:
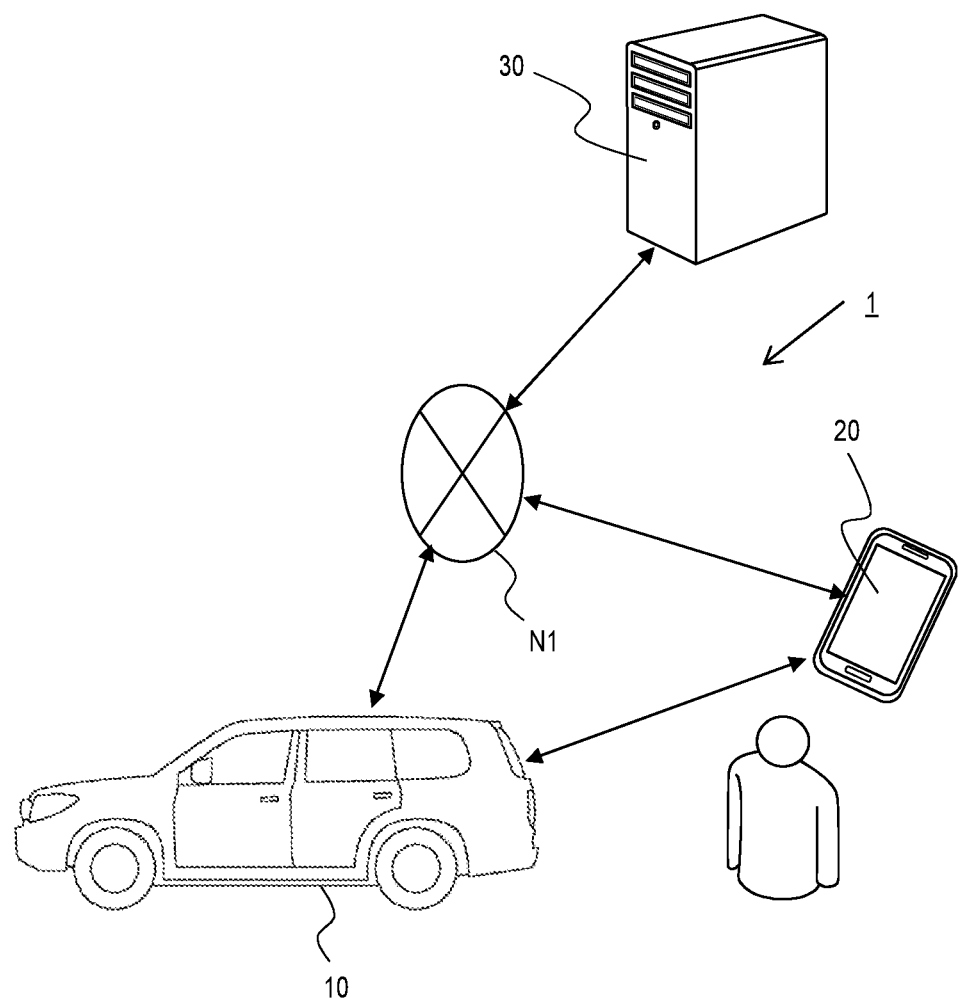
FIG. 1 is a diagram illustrating a schematic configuration of a system according to an embodiment.

An information processing apparatus, which is one of the aspects of the present disclosure, includes a control unit that sets or releases a remote immobilizer function and a smart cancel function. The remote immobilizer function determines whether an activation operation of a vehicle is a legitimate operation based on a key code sent from a key owned by a user, and is a function for remotely setting and releasing an immobilizer function that controls activation of the vehicle according to the determination result. Hereinbelow, remotely setting the immobilizer function is referred to as setting the remote immobilizer function, and remotely releasing the immobilizer function is referred to as releasing the remote immobilizer function. Since the vehicle does not receive an input of a signal and the like from the outside when the remote immobilizer function is set, the vehicle cannot be activated. For this reason, neither an invalid key nor a legitimate key owned by the user is authenticated by the vehicle when the remote immobilizer function is set, and thus the vehicle cannot be activated.

"Activation of the vehicle" means that the vehicle becomes a state where it can travel according to an operation of a driver. It is a concept that includes, for example, starting an engine in response to turning on an ignition (turning on an IG switch) in an engine vehicle or activating a controller (such as an ECU) that controls the entire vehicle in an electric vehicle (such as a hybrid vehicle and a range extender vehicle).

Further, the smart cancel function is a function for stopping radio waves transmitted from the vehicle for communication between the vehicle and the key owned by the user. Examples of the radio waves include a polling signal for searching for a key. Hereinbelow, stopping the radio waves transmitted from the vehicle is referred to as setting the smart cancel function, and transmitting radio waves from the vehicle is referred to as releasing the smart cancel function. Since the key is not authenticated by the vehicle when the smart cancel function is set, it is not possible to release a door lock using the key or activate the vehicle.

The control unit acquires a distance between the vehicle and the user terminal based on position information of the vehicle and position information of the user terminal. For example, when the positions of the vehicle and the user terminal are known using a GPS system, the distance between the vehicle and the user terminal can be calculated. Here, the vehicle is associated with the user terminal. The user terminal that outputs the position information to the control unit may have a function of an electronic key of a vehicle.

Then, the control unit generates a command for setting or releasing the remote immobilizer function and the smart cancel function based on the distance between the vehicle and the user terminal. For example, in a case where the user terminal is distanced from the vehicle, it is unlikely that the user will immediately drive the vehicle. Therefore, when the remote immobilizer function and the smart cancel function are set, it is possible to prevent the vehicle from being stolen. For example, even in a case where radio waves sent from the vehicle are to be relayed with a relay or the like, they are not transmitted from the vehicle when the smart cancel function is set. Therefore, it is possible to prevent a so-called relay attack. Further, for example, even in a case where the key is stolen, the vehicle cannot be activated when the user terminal is distanced from the vehicle. Therefore, it is possible to prevent the vehicle from being stolen.

Further, when the distance between the vehicle and the user terminal is equal to or longer than a predetermined distance, the control unit may set the remote immobilizer function and the smart cancel function. Further, when the distance between the vehicle and the user terminal is shorter than the predetermined distance, the control unit may release the remote immobilizer function and the smart cancel function. The predetermined distance is set as a distance at which it is possible to prevent the vehicle from being stolen. Alternatively, the predetermined distance may be set based on a range in which radio waves used for locking/unlocking from the vehicle or the user terminal are reached.

Further, when the distance between the vehicle and the user terminal is equal to or longer than a second predetermined distance and shorter than the predetermined distance, the control unit may release the smart cancel function and set the remote immobilizer function. Further, when the distance between the vehicle and the user terminal is shorter than the second predetermined distance, the control unit may release the smart cancel function and the remote immobilizer function. When the distance between the vehicle and the user terminal is shorter than the predetermined distance and the remote immobilizer function and the smart cancel function are released, there is a probability that the vehicle may be stolen depending on the predetermined distance. Here, if the remote immobilizer function and the smart cancel function are released when the user terminal approaches the vehicle by a second predetermined distance, which is shorter than the predetermined distance, it is possible to more reliably prevent the vehicle from being stolen. The second predetermined distance may be, for example, a distance at which the user can touch the vehicle (for example, 1 m), a distance at which the user can immediately run to the vehicle, or a distance at which the user can see the vehicle.

Hereinafter, embodiments of the present disclosure will be described with reference to the drawings. The configurations of the following embodiments are examples, and an applicable embodiment of the present disclosure is not limited thereto. Further, the embodiments hereinbelow can be combined as much as possible.

First Embodiment

FIG. 1 is a diagram illustrating a schematic configuration of a system 1 according to the present embodiment. The system 1 includes a vehicle 10, a user terminal 20, and a central server 30. The vehicle 10 is associated with the user terminal 20. The vehicle 10 has a smart key system mounted thereon. The smart key system locks/unlocks a door of the vehicle 10 by executing wireless communication between the vehicle 10 and the user terminal 20 owned by the user. When the user terminal 20 is present in the vehicle 10, the vehicle 10 can be activated. The smart key system authenticates a legitimate user by periodically polling the user terminal 20 via wireless communication from the vehicle 10 and receiving a signal, such as an ID code, sent from the user terminal 20 to the vehicle 10 as a form of a response to the polling.

The central server 30 sets and releases the remote immobilizer function and the smart cancel function. When the remote immobilizer function is set, the vehicle 10 becomes a state where it is prohibited from being activated. In the state where the remote immobilizer function is set, even, for example, a legitimate user cannot activate the vehicle 10. On the other hand, when the remote immobilizer function is released, the vehicle 10 can be activated by the user terminal 20.

Further, the smart cancel function is a function for remotely stopping the sending of a polling signal from the vehicle 10 in the smart key system. When the smart cancel function is set, the sending of a polling signal from the vehicle 10 in the smart key system is stopped. When the smart cancel function is released, a polling signal is sent from the vehicle 10 in the smart key system.

The central server 30 acquires the position information of the vehicle 10 and the user terminal 20. Then, when the distance between the vehicle 10 and the user terminal 20 is equal to or longer than a first predetermined distance, the central server 30 sets the remote immobilizer function and the smart cancel function. Here, the first predetermined distance may be, for example, a distance at which the user cannot immediately board the vehicle 10. When the distance between the vehicle 10 and the user terminal 20 is equal to or longer than the first predetermined distance, it is considered that the vehicle 10 is kept in a parking state. In such a state, the user does not lock/unlock the door using the smart key system. Further, in such a state, the user does not immediately drive the vehicle 10, either. Therefore, it is considered that the user will rarely have a problem even when the remote immobilizer function is set and thus the vehicle 10 is not activated. Further, even when the smart cancel function is set and thus a polling signal is not transmitted from the vehicle 10, the user will not lock/unlock the door in the case where the distance between the vehicle 10 and the user terminal 20 is equal to or longer than the first predetermined distance. Therefore, it is considered that the user will rarely have a problem.

On the other hand, when the remote immobilizer function and the smart cancel function are set, a third party cannot activate the vehicle 10 or relay a polling signal, and thus a crime prevention effect is enhanced. Further, when the distance between the vehicle 10 and the user terminal 20 is equal to or longer than the first predetermined distance, the central server 30 automatically sets the remote immobilizer function and the smart cancel function, and thus the user does not have to operate the user terminal 20.

Further, when the distance between the vehicle 10 and the user terminal 20 is shorter than the first predetermined distance, the vehicle 10 is present at a distance at which the user can see the vehicle. Thus, even when the remote immobilizer function or the smart cancel function is released, it is difficult for a third party to activate the vehicle 10 or move the vehicle 10.

When the distance between the vehicle 10 and the user terminal 20 is equal to or longer than the second predetermined distance and shorter than the first predetermined distance, the smart cancel function may be released, and when the distance between the vehicle 10 and the user terminal 20 is shorter than the second predetermined distance, the remote immobilizer function may be released. As such, by gradually releasing the smart cancel function and the remote immobilizer function, it is possible to further enhance the crime prevention effect.

The vehicle 10, the user terminal 20, and the central server 30 are connected to each other via a network N1. The network N1 may be, for example, a world-wide public communication network, such as the Internet, and a Wide Area Network (WAN) or another communication network may be employed. Further, the network N1 may include a telephone communication network, such as a mobile phone, and a wireless communication network, such as Wi-Fi®. Further, the vehicle 10 is connected to the user terminal 20 via near-field wireless communication and the like. FIG. 1 illustrates one vehicle 10 as an example, but there may be a plurality of vehicles 10. Further, there may be a plurality of users and user terminals 20 according to the number of vehicles 10.

Figure 2:
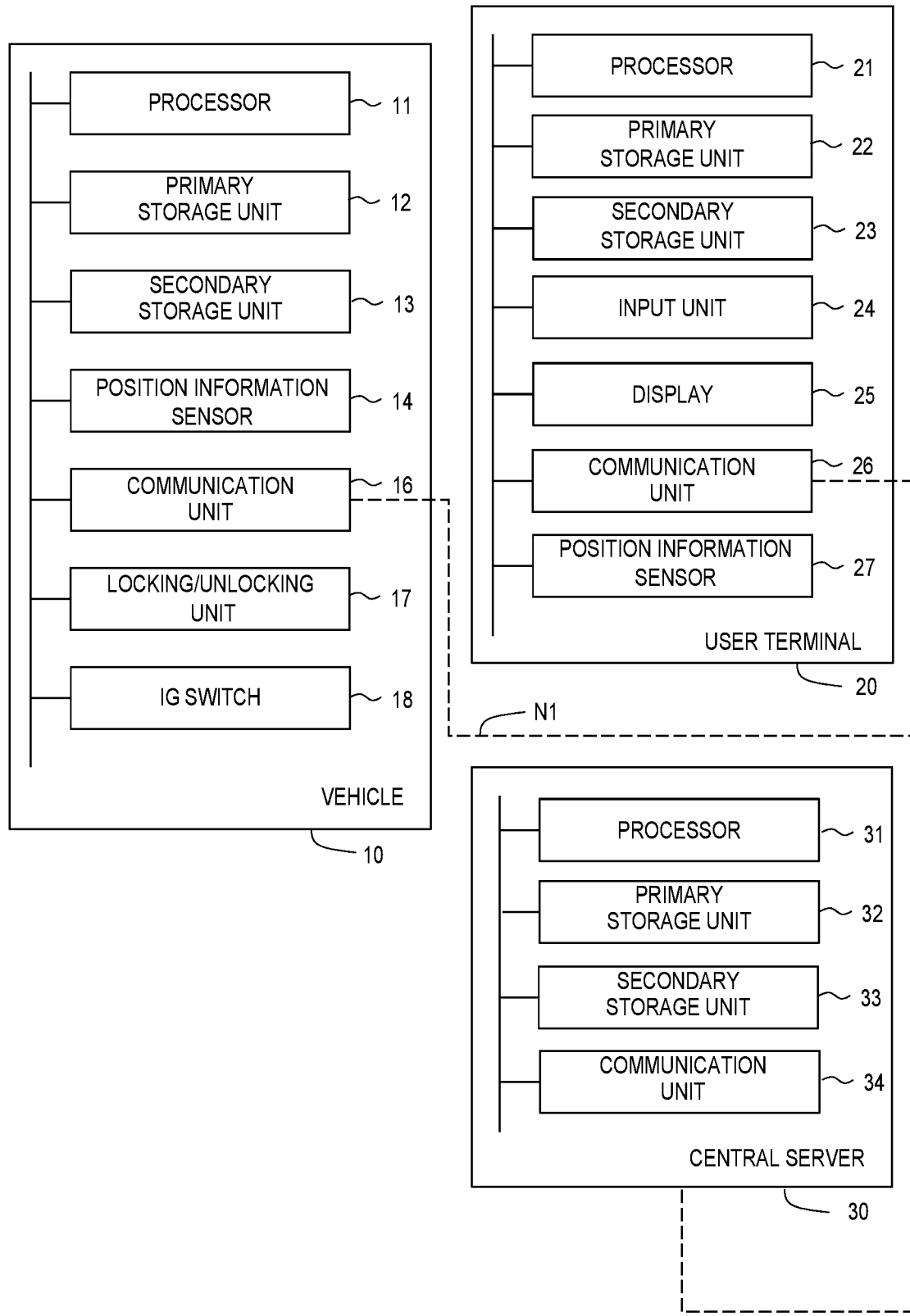
FIG. 2 is a block diagram schematically illustrating an example of a configuration of each of a vehicle, a user terminal, and a central server which constitute the system according to the embodiment.

A hardware configuration and a functional configuration of each of the vehicle 10, the user terminal 20, and the central server 30 will be described with reference to FIG. 2. FIG. 2 is a block diagram schematically illustrating an example of a configuration of each of the vehicle 10, the user terminal 20, and the central server 30 which constitute the system 1 according to the embodiment.

The central server 30 has a general computer configuration. The central server 30 includes a processor 31, a primary storage unit 32, a secondary storage unit 33, and a communication unit 34. These are connected to each other via buses.

The processor 31 may be a central processing unit (CPU), a digital signal processor (DSP), or the like. The processor 31 controls the central server 30 and executes various information processing calculations. The primary storage unit 32 may be a random access memory (RAM), a read-only memory (ROM), or the like. The secondary storage unit 33 may be an erasable programmable ROM (EPROM), a hard disk drive (HDD), removable media, or the like. The secondary storage unit 33 stores an operating system (OS), various programs, various tables, and the like. The processor 31 loads the program stored in the secondary storage unit 33 into a work area of the primary storage unit 32 and executes it, and each component and the like are controlled by the execution of the program. As such, the central server 30 implements a function that meets a predetermined purpose. The primary storage unit 32 and the secondary storage unit 33 may be computer-readable storage media. The central server 30 may be a single computer or a plurality of computers connected to each other. Further, information stored in the secondary storage unit 33 may be stored in the primary storage unit 32. Alternatively, information stored in the primary storage unit 32 may be stored in the secondary storage unit 33. The processor 31 is an example of the control unit according to the present disclosure.

The communication unit 34 is a tool used for communicating with the vehicle 10 and the user terminal 20 via the network N1. Examples of the communication unit 34 include a local area network (LAN) interface board or a wireless communication circuit for wireless communication. The LAN interface board or the wireless communication circuit is connected to the network N1.

A series of processes executed by the central server 30 can be executed by hardware, but can also be executed by software.

Next, the user terminal 20 will be described. The user terminal 20 may be a small computer, such as a smartphone, a mobile phone, a tablet terminal, a personal information terminal, a wearable computer (such as a smart watch), or a personal computer (PC). The user terminal 20 has a function of an electronic key of a smart key system. The user terminal 20 includes a processor 21, a primary storage unit 22, a secondary storage unit 23, an input unit 24, a display 25, a communication unit 26, and a position information sensor 27. These are connected to each other via buses. Since the processor 21, the primary storage unit 22, and the secondary storage unit 23 are the same as the processor 31, the primary storage unit 32, and the secondary storage unit 33 of the central server 30, description thereof will be omitted.

The input unit 24 is a tool used for receiving an input operation executed by the user, and examples thereof include a touch panel, a mouse, a keyboard, or a push button. The display 25 is a tool used for presenting information to the user, and examples thereof include a liquid crystal display (LCD) or an electroluminescence (EL) panel. The input unit 24 and the display 25 may be configured as one touch panel display.

The communication unit 26 is a communication tool used for connecting the user terminal 20 to the network N1. The communication unit 26 is a circuit used for communicating with another device (such as the vehicle 10 or the central server 30) via the network N1, using, for example, a mobile communication service (such as a telephone communication network, such as Fifth Generation (5G), Fourth Generation (4G), Third Generation (3G), and the Long-Term Evolution (LTE)), and a wireless communication network, such as Wi-Fi® and Bluetooth®. Further, the communication unit 26 is a tool used for receiving a polling signal or the like sent via radio waves in a low frequency band (for example, 100 KHz to 300 KHz, hereinafter referred to as an LF band) from the vehicle 10. Further, the communication unit 26 is a tool used for sending authentication information, a locking/unlocking signal, and the like via radio waves in a high frequency band (such as 100 MHz to 1 GHz, hereinafter referred to as an RF band) to the vehicle 10. The locking/unlocking signal is a signal for locking or unlocking the door.

The position information sensor 27 acquires the position information (such as the latitude and longitude) of the user terminal 20. Examples of the position information sensor 27 include a Global Positioning System (GPS) receiving unit, and a wireless LAN communication unit.

Next, the vehicle 10 will be described. The vehicle 10 includes a processor 11, a primary storage unit 12, a secondary storage unit 13, a position information sensor 14, a communication unit 16, a locking/unlocking unit 17, and an IG switch 18. These are connected to each other via buses. Since the processor 11, the primary storage unit 12, the secondary storage unit 13, and the position information sensor 14 are the same as the processor 21, the primary storage unit 22, the secondary storage unit 23, and the position information sensor 27 of the user terminal 20, the description thereof will be omitted.

The communication unit 16 is a communication tool used for connecting the vehicle 10 to the network N1. The communication unit 16 is a circuit used for communicating with another device (such as the user terminal 20 or the central server 30) via the network N1, using, for example, a mobile communication service (for example, a telephone communication network, such as Fifth Generation (5G), Fourth Generation (4G), Third Generation (3G), and the Long-Term Evolution (LTE)), and a wireless communication network, such as Wi-Fi® and Bluetooth®. Further, the communication unit 16 is a tool used for sending radio waves in the LF band for searching for (polling) the user terminal 20. Further, the communication unit 16 is a tool used for receiving radio waves in the RF band sent from the user terminal 20.

The locking/unlocking unit 17 locks/unlocks the door of the vehicle 10. The locking/unlocking unit 17 may have, for example, a door lock motor. The locking/unlocking unit 17 may be an actuator that locks/unlocks the door of the vehicle 10 (including a boarding/exiting door, a rear door, and a trunk door). The IG switch 18 is a switch used for activating the vehicle 10 or stopping a function of the vehicle 10 when pressed by the user.

Next, a function of the central server 30 will be described. FIG. 3 is a diagram exemplifying a functional configuration of the central server 30. The central server 30 includes a control unit 301 and a vehicle information DB 311 as functional components. The processor 31 of the central server 30 executes processing of the control unit 301 using a computer program on the primary storage unit 32.

The vehicle information DB 311 is constructed when a program of a database management system (DBMS) executed by the processor 31 manages data stored in the secondary storage unit 33. Examples of the vehicle information DB 311 include a relational database.

A part of the processing of the control unit 301 may be executed by another computer connected to the network N1.

The control unit 301 acquires the position information of the vehicle 10 and the position information of the user terminal 20. Then, the control unit 301 calculates the distance between the vehicle 10 and the user terminal 20 based on a current position of the vehicle 10 and a current position of the user terminal 20.

The control unit 301 sets and releases the smart cancel function based on the distance between the vehicle 10 and the user terminal 20. The control unit 301 generates a command for setting the smart cancel function or a command for cancelling the smart cancel function, and sends the command to the vehicle 10.

A condition for setting the smart cancel function includes a fact that the distance between the vehicle 10 and the user terminal 20 is equal to or longer than the first predetermined distance. Alternatively, the condition may be a fact that the distance between the vehicle 10 and the user terminal 20 has changed from the state where it is shorter than the first predetermined distance to the state where it is equal to or longer than the first predetermined distance. In addition, the condition can include a fact that the function of the vehicle 10 is in a stopped state, a fact that the door of the vehicle 10 is locked, and the like. When the condition for setting the smart cancel function is satisfied, the control unit 301 generates the command for setting the smart cancel function and sends the command to the vehicle 10.

A condition for releasing the smart cancel function includes the fact that the distance between the vehicle 10 and the user terminal 20 is shorter than the first predetermined distance. Alternatively, the condition may be a fact that the distance between the vehicle 10 and the user terminal 20 has changed from the state where it is equal to or longer than the first predetermined distance to the state where it is shorter than the first predetermined distance. When the condition for releasing the smart cancel function is satisfied, the control unit 301 generates the command for releasing the smart cancel function and sends the command to the vehicle 10.

Further, the control unit 301 sets and releases the remote immobilizer function based on the distance between the vehicle 10 and the user terminal 20. The control unit 301 generates a command for setting the remote immobilizer function or a command for releasing the remote immobilizer function, and sends the command to the vehicle 10.

The condition for setting the remote immobilizer function includes the fact that the distance between the vehicle 10 and the user terminal 20 is equal to or longer than the second predetermined distance. Alternatively, the condition may be a fact that the distance between the vehicle 10 and the user terminal 20 has changed from the state where it is shorter than the second predetermined distance to the state where it is equal to or longer than the second predetermined distance. In addition, the condition can include a fact that the function of the vehicle 10 is in a stopped state, a fact that the door of the vehicle 10 is locked, and the like. When the condition for setting the remote immobilizer function is satisfied, the control unit 301 generates a command for setting the remote immobilizer function and sends the command to the vehicle 10.

The condition for releasing the remote immobilizer function includes the fact that the distance between the vehicle 10 and the user terminal 20 is shorter than the second predetermined distance. Alternatively, the condition may be a fact that the distance between the vehicle 10 and the user terminal 20 has changed from the state where it is equal to or longer than the second predetermined distance to the state where it is shorter than the second predetermined distance. When the condition for releasing the remote immobilizer function is satisfied, the control unit 301 generates a command for releasing the remote immobilizer function and sends the command to the vehicle 10.

The first predetermined distance and the second predetermined distance may have the same value or different values. For example, in a case where the first predetermined distance has a greater value than that of the second predetermined distance, when the user holding the user terminal 20 exits the vehicle 10 and moves away from the vehicle 10, the remote immobilizer function is set first, and then the smart cancel function is set. On the other hand, when the user holding the user terminal 20 approaches the vehicle 10, the smart cancel function is released first, and when the user further approaches the vehicle 10, then the remote immobilizer function is released.

The vehicle information DB 311 is formed by storing vehicle information in the secondary storage unit 33. FIG. 4 is a diagram exemplifying a table configuration of the vehicle information. The vehicle information table has fields of a vehicle ID, a user terminal ID, a vehicle position, a user terminal position, a distance, and a security level, respectively. Information for identifying the vehicle 10 is entered into the vehicle ID field. Information for identifying the user terminal 20 is entered into the user terminal ID field. The user terminal ID is associated with the vehicle ID and registered in advance. The position information of the vehicle 10 acquired from the vehicle 10 is entered into the vehicle position field. The position information of the user terminal 20 acquired from the user terminal 20 is entered into the user terminal position field. Information on the distance between the vehicle 10 and the user terminal 20 is entered into the distance field. The distance between the vehicle 10 and the user terminal 20 is calculated by the control unit 301. Information on a current security level of the vehicle 10 is entered into the security level field. The security level is determined by the control unit 301. The security level will be described below.

Next, the function of the vehicle 10 will be described. FIG. 5 is a diagram exemplifying a functional configuration of the vehicle 10. The vehicle 10 includes a control unit 101 as a functional component. The processor 11 of the vehicle 10 executes processing of the control unit 101 using a computer program on the primary storage unit 12.

The control unit 101 executes a control for sending a polling signal as radio waves in the LF band via the communication unit 16. Further, the control unit 101 executes a control for receiving the locking/unlocking signal sent as radio waves in the RF band from the user terminal 20 via the communication unit 16.

Further, the control unit 101 authenticates a fact that the locking/unlocking signal sent from the user terminal 20 is sent from a legitimate device. Specifically, the control unit 101 determines whether a key ID included in the locking/unlocking signal matches the key ID stored in advance in the secondary storage unit 13.

Specifically, the control unit 101 sends a polling signal to the inside and the outside of the vehicle via the communication unit 16 at regular intervals, and receives a reply signal sent by the user terminal 20 in response to the polling signal. The reply signal includes the key ID unique to the user terminal 20, the secondary storage unit 13 of the vehicle 10 stores a registered key ID, and the control unit 101 executes authentication processing of the user terminal 20 by checking the received key ID against the stored key ID. When the authentication of the user terminal 20 is successful, it is possible to execute a predetermined operation (such as unlocking the door and releasing the immobilizer) to the vehicle 10. The same processing is executed in the case of locking.

The control unit 101 sends an unlocking command or a locking command to the locking/unlocking unit 17 based on the authentication result. The signal may be sent via an in-vehicle network, such as a Controller Area Network (CAN). The control unit 101 may send an unlocking command or a locking command in response to an action (such as pressing an unlock button and touching a doorknob) by the user.

Further, the control unit 101 receives, from the central server 30, a command for setting and releasing the smart cancel function and the remote immobilizer function. Upon receiving, from the central server 30, a command for setting the smart cancel function, the control unit 101 stops the transmission of a polling signal. Stopping the transmission of a polling signal includes preventing a polling signal from being transmitted as a result, such as stopping a supply of electric power to a circuit that transmits a polling signal.

Further, upon receiving, from the central server 30, a command for releasing the smart cancel function, the control unit 101 starts transmitting a polling signal. Starting the transmission of a polling signal includes transmitting a polling signal as a result, such as starting a supply of electric power to a circuit that transmits a polling signal.

Further, upon receiving, from the central server 30, a command for setting the remote immobilizer function, the control unit 101 prohibits the activation of the vehicle 10. Prohibiting the activation of the vehicle 10 includes, for example, rejecting an input from the user to the vehicle 10, cutting off a supply of electric power required for the operation of the vehicle 10, or prohibiting the start of the engine. For example, when the remote immobilizer function is set, the control unit 101 does not execute the processing for starting the engine even when the user presses the IG switch 18.

Further, upon receiving, from the central server 30, a command for releasing the remote immobilizer function, the control unit 101 permits the activation of the vehicle 10. For example, when the user presses the IG switch 18, the control unit 101 executes the processing for starting the engine.

Figure 6:
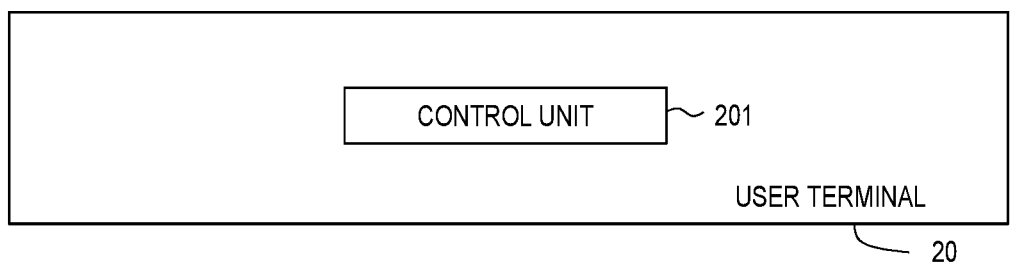
FIG. 6 is a diagram exemplifying a functional configuration of a user terminal.

Next, a function of the user terminal 20 will be described. FIG. 6 is a diagram exemplifying a functional configuration of the user terminal 20. The user terminal 20 includes a control unit 201 as a functional component. The processor 21 of the user terminal 20 executes processing of the control unit 201 using a computer program on the primary storage unit 22. The user terminal 20 has a function for receiving a polling signal sent as radio waves in the LF band, a function for sending a locking/unlocking signal using the radio waves in the RF band, and a function for sending a current position.

The control unit 201 executes a control for receiving a polling signal sent as radio waves in the LF band from the vehicle 10 via the communication unit 26. Further, the control unit 201 executes a control for sending a locking/unlocking signal as radio waves in the RF band via the communication unit 26. Further, the control unit 201 sends, to the vehicle 10, an ID of the electronic key (hereinafter, also referred to as a key ID) together with the locking/unlocking signal, at the same time. The key ID is stored in advance in the secondary storage unit 23.

The control unit 201 displays an operation screen on the display 25, and generates an unlocking request or a locking request based on the operation executed by the user. For example, the control unit 201 outputs an icon used for unlocking, an icon used for locking, and the like to a touch panel display, and generates the unlocking request or the locking request based on the operation executed by the user. The operation executed by the user is not limited to the operation via the touch panel display and may be, for example, an operation via a hardware switch and the like.

Figure 7:
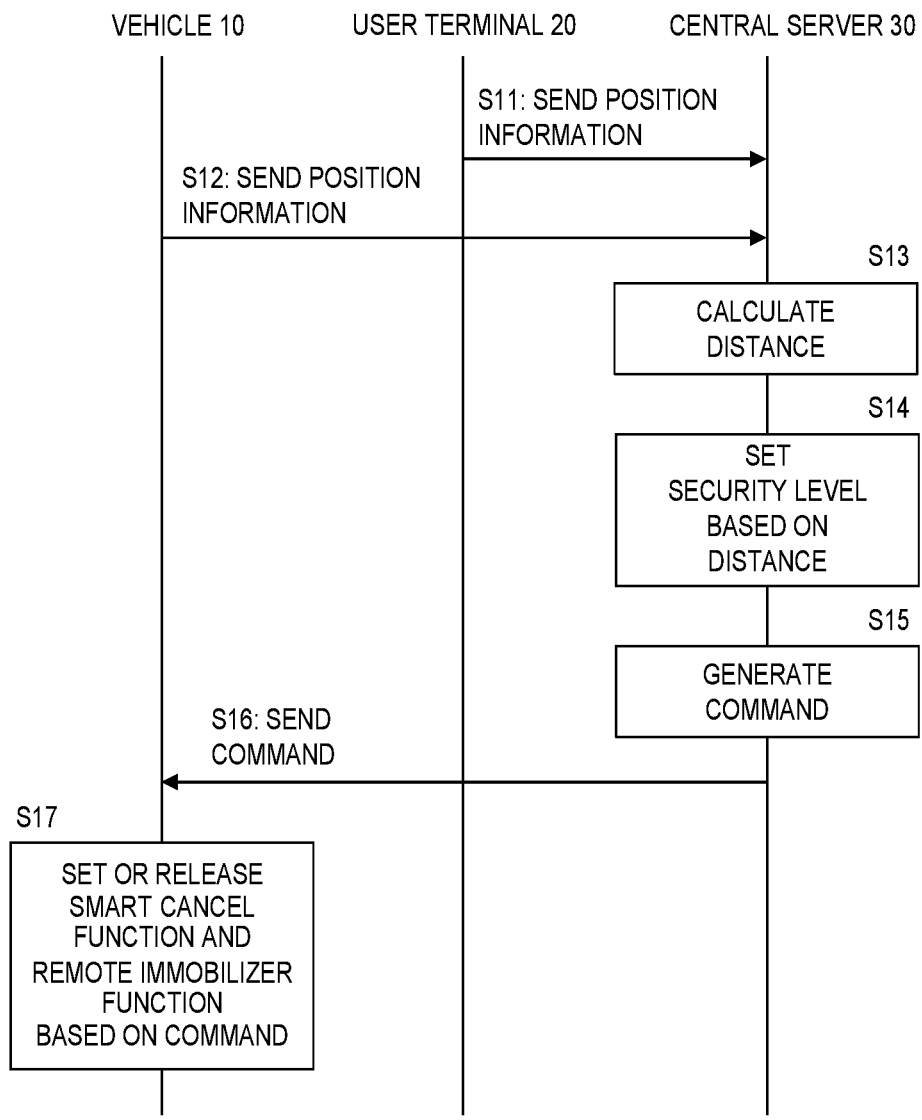
FIG. 7 is a sequence diagram illustrating entire processing of the system.

Next, the entire processing of the system 1 will be described. FIG. 7 is a sequence diagram illustrating the entire processing of the system 1. The vehicle 10 and the user terminal 20 illustrated in FIG. 7 are associated in advance and registered in the central server 30. Position information is sent from the user terminal 20 and the vehicle 10 to the central server 30 at predetermined time intervals (S11, S12). The position information may be represented by, for example, the latitude and longitude. The acquired position information is stored in the vehicle information DB 311. The central server 30 calculates the distance between the vehicle 10 and the user terminal 20 based on the position information of the vehicle 10 and the position information of the user terminal 20 (S13). The calculated distance is stored in the vehicle information DB 311.

The central server 30 sets a security level based on the distance between the vehicle 10 and the user terminal 20 (S14). There are three security levels. A case where the distance between the vehicle 10 and the user terminal 20 is equal to or longer than the first predetermined distance is defined as a third level, a case where the distance between the vehicle 10 and the user terminal 20 is equal to or longer than the second predetermined distance and shorter than the first predetermined distance is defined as a second level, and a case where the distance between the vehicle 10 and the user terminal 20 is shorter than the second predetermined distance is defined as a first level. At the first level, both the remote immobilizer function and the smart cancel function are released. At the second level, the remote immobilizer function is set and the smart cancel function is released. At the third level, both the remote immobilizer function and the smart cancel function are set. The set security level is stored in the vehicle information DB 311.

The central server 30 generates a command according to the set security level (S15) and sends the command to the vehicle 10 (S16). The vehicle 10 sets or releases the smart cancel function and the remote immobilizer function based on the command received from the central server 30.

Figure 8:
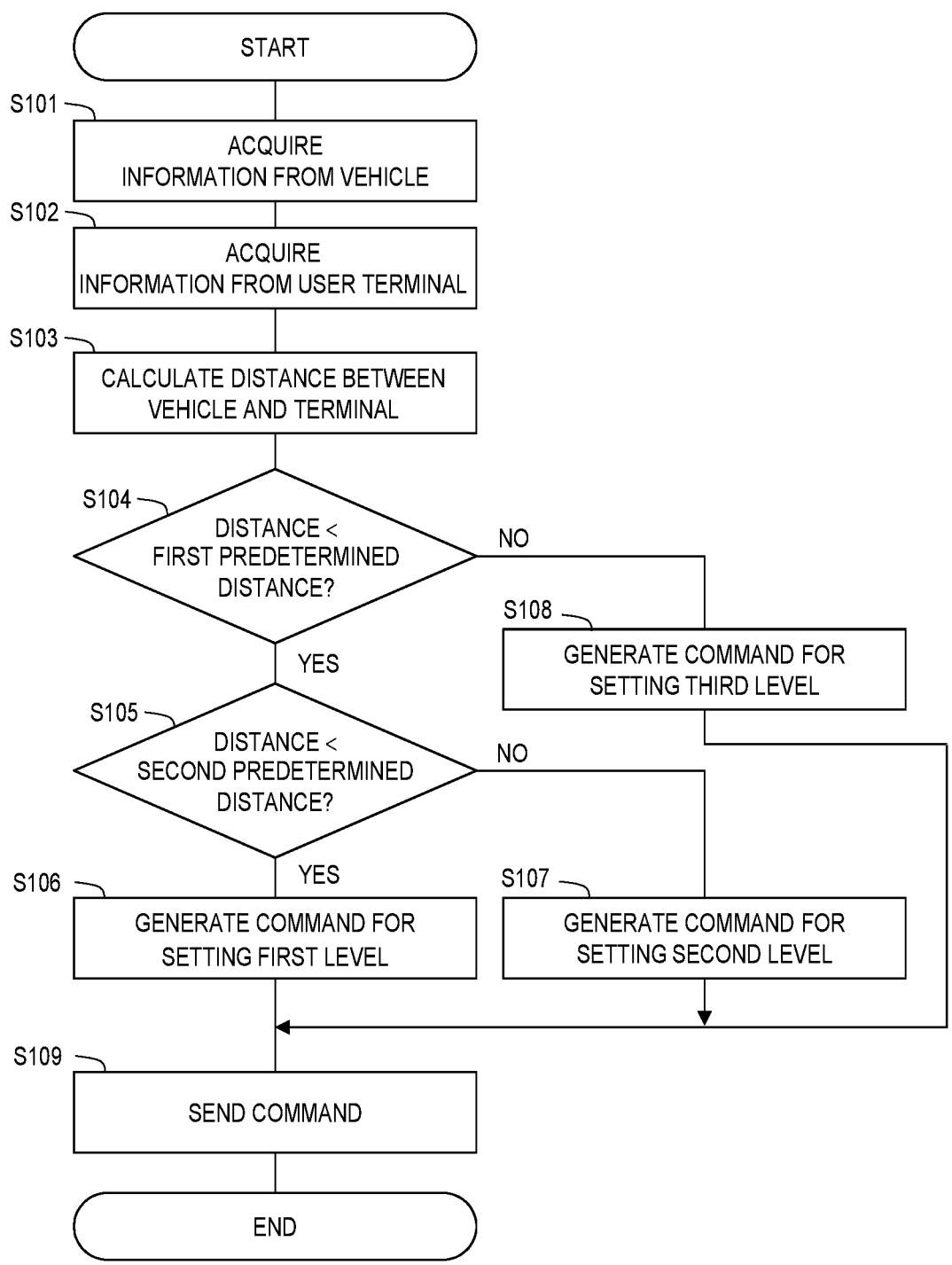
FIG. 8 is a flowchart of sending a command from the central server to the vehicle.

Next, a flow for sending a command from the central server 30 to the vehicle 10 will be described. FIG. 8 is a flowchart of sending a command from the central server 30 to the vehicle 10. A routine illustrated in FIG. 8 is executed on each vehicle 10 at predetermined time intervals.

In step S101, the control unit 301 acquires information from the vehicle 10. The information acquired at this time includes the position information of the vehicle 10. Further, the information acquired from the vehicle 10 is associated with the vehicle ID. In step S102, the control unit 301 acquires information from the user terminal 20. The information acquired at this time includes the position information of the user terminal 20. Further, the information acquired from the user terminal 20 is associated with the user terminal ID. Further, the user terminal 20 is associated with the vehicle 10.

In step S103, the control unit 301 calculates the distance between the vehicle 10 and the user terminal 20. In step S104, the control unit 301 determines whether the distance between the vehicle 10 and the user terminal 20 calculated in step S103 is shorter than the first predetermined distance. When the determination is positive in step S104, the process proceeds to step S105, and when the determination is negative, the process proceeds to step S108. In step S108, the control unit 301 generates a command for setting the security level of the vehicle 10 to the third level. In other words, the control unit 301 generates a command for setting the smart cancel function and the remote immobilizer function.

In step S105, the control unit 301 determines whether the distance between the vehicle 10 and the user terminal 20 calculated in step S103 is shorter than the second predetermined distance. When the determination is positive in step S105, the process proceeds to step S106 and the control unit 301 generates a command for setting the security level of the vehicle 10 to the first level. In other words, the control unit 301 generates a command for releasing the smart cancel function and the remote immobilizer function.

On the other hand, when the determination is negative in step S105, the process proceeds to step S107 and the control unit 301 generates a command for setting the security level of the vehicle 10 to the second level. In other words, the control unit 301 generates a command for releasing the smart cancel function and setting the remote immobilizer function.

Then, in step S109, the control unit 301 sends the command generated in step S106, S107, or S108 to the vehicle 10. The command may be sent only when the currently set security level differs from the security level to be set.

Figure 9:
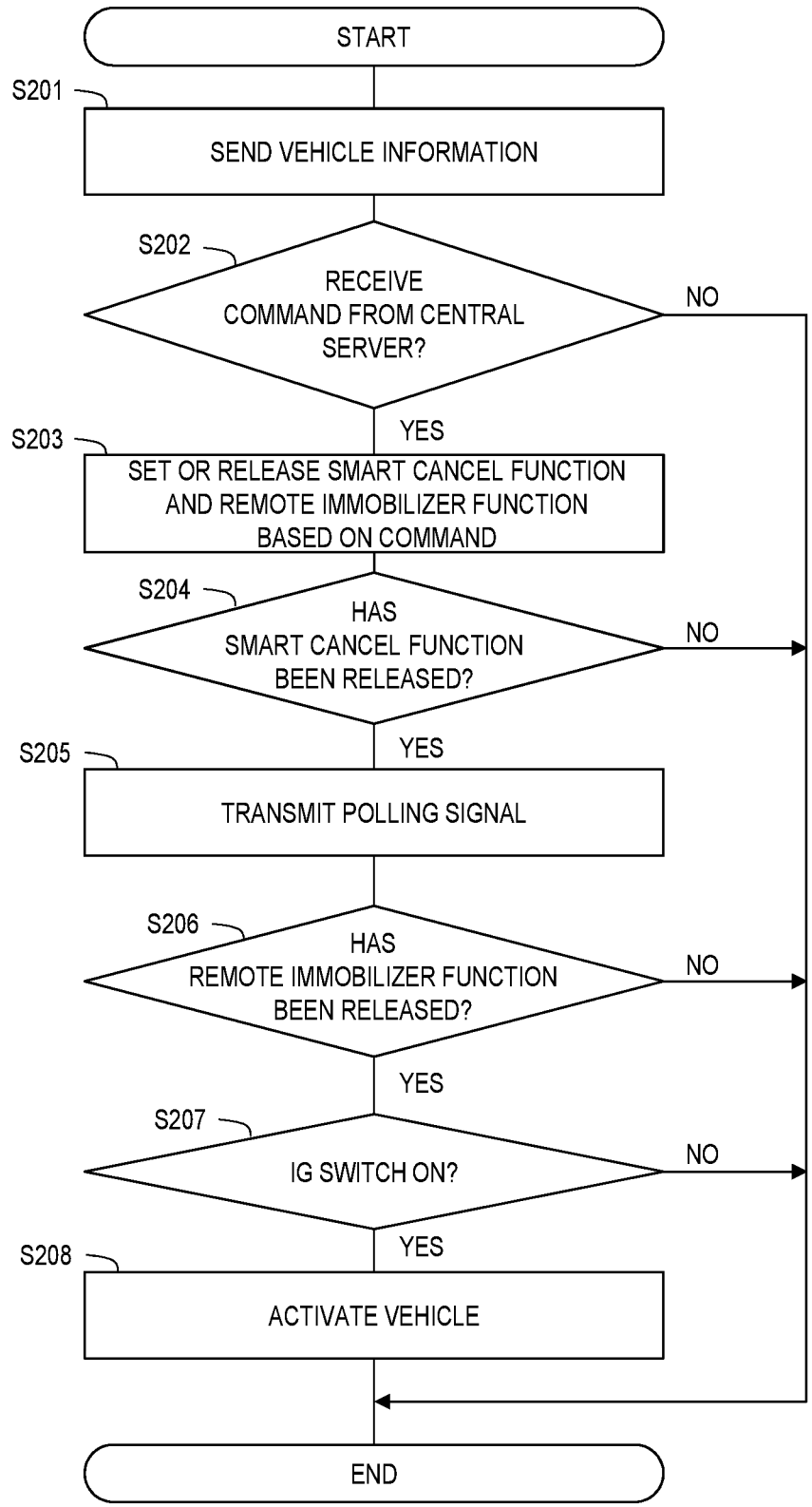
FIG. 9 is a flowchart of processing in the vehicle.

Next, FIG. 9 is a flowchart of processing in the vehicle 10. A routine illustrated in FIG. 9 is executed on the vehicle 10 at predetermined time intervals. In step S201, the control unit 101 sends the information of the vehicle 10 to the central server 30. The information of the vehicle 10 includes the position information detected by the position information sensor 14. In addition, together with the above information, the control unit 101 may send information on an activation state, a door lock state, the current security level, and the like, of the vehicle 10.

In step S202, the control unit 101 determines whether the command has been received from the central server 30. This command is the command transmitted from the central server 30 in step S109. When the determination is positive in step S202, the process proceeds to step S203, and when the determination is negative, this routine ends.

In step S203, the control unit 101 sets or releases the smart cancel function and the remote immobilizer function based on the command from the central server 30. In step S204, the control unit 101 determines whether the smart cancel function has been released. In this step S204, it is determined whether the polling signal may be transmitted. When the determination is positive in step S204, the process proceeds to step S205, and when the determination is negative, this routine ends.

In step S205, the control unit 101 transmits a polling signal. As such, when the user terminal 20 is present within a communicable distance, communication with the user terminal 20 is established. In step S206, the control unit 101 determines whether the remote immobilizer function has been released. In this step S206, it is determined whether the vehicle 10 is in an activatable state. When the determination is positive in step S206, the process proceeds to step S207, and when the determination is negative, this routine ends.

In step S207, the control unit 101 determines whether the IG switch 18 has been pressed. When the determination is positive in step S207, the process proceeds to step S208, and when the determination is negative, this routine ends.

In step S208, the control unit 101 activates the vehicle 10. The control unit 101 may start the engine or set the vehicle 10 to become a state where it can be driven by an electric motor.

Figure 10:
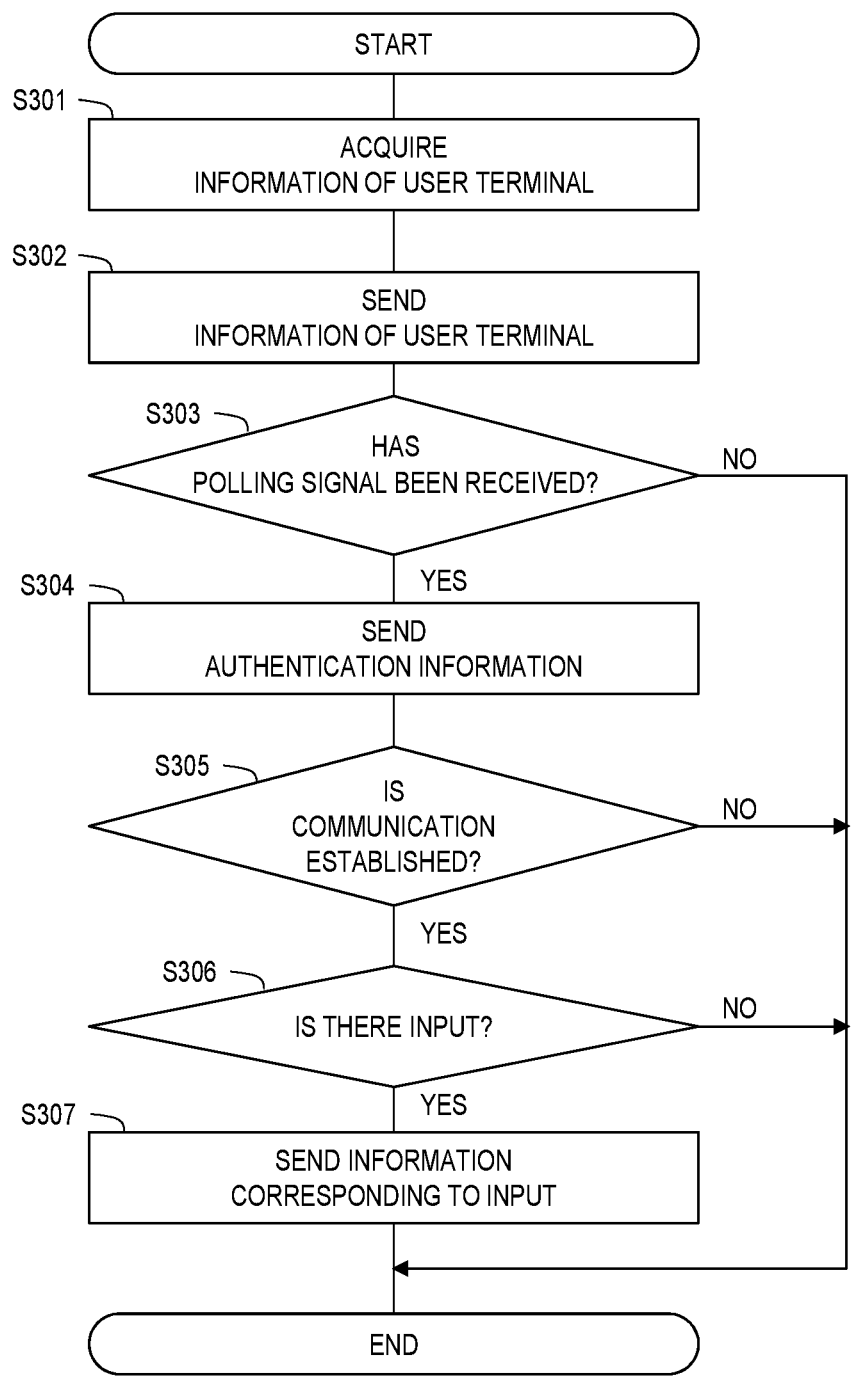
FIG. 10 is a flowchart of processing in the user terminal.

Next, processing in the user terminal 20 will be described. FIG. 10 is a flowchart of the processing in the user terminal 20. This routine is executed on the user terminal 20 at predetermined time intervals. In step S301, the control unit 201 acquires the information of the user terminal 20. The control unit 201 acquires, for example, the position information detected by the position information sensor 27. In step S302, the control unit 201 sends the information acquired in step S301 to the central server 30. This information is associated with the user terminal ID.

In step S303, the control unit 201 determines whether the polling signal has been received from the vehicle 10. When the determination is positive in step S303, the process proceeds to step S304, and when the determination is negative, this routine ends. In step S304, the control unit 201 sends authentication information to the vehicle 10. Then, in step S305, the control unit 201 determines whether communication with the vehicle 10 has been established. When the determination is positive in step S305, the process proceeds to step S306, and when the determination is negative, this routine ends.

In step S306, the control unit 201 determines whether there has been an input to the input unit 24. For example, the control unit 201 determines whether the user has input a release of the door lock to the input unit 24. When the determination is positive in step S306, the process proceeds to step S307, and when the determination is negative, this routine ends. In step S307, the control unit 201 generates information corresponding to the input to the input unit 24 and sends the information to the vehicle 10. For example, the control unit 201 sends, to the vehicle 10, a request for unlocking the door.

As described above, with the present embodiment, the smart cancel function and the remote immobilizer function are set or released based on the distance between the vehicle 10 and the user terminal 20, and thus it is possible to prevent the vehicle 10 from being stolen by, for example, the so-called relay attack that misuses a polling signal of the vehicle 10. Further, by gradually changing the security level, it is possible to enhance the security effect while restricting a decrease in the user's convenience.

Second Embodiment

In the present embodiment, when the IG switch 18 of the vehicle 10 is pressed, the central server 30 inquires of the user terminal 20 as to whether the vehicle 10 may be activated, and when there is a reply from the user terminal 20 indicating that the vehicle may be activated, the vehicle 10 is activated. For example, only when the reply indicating that the vehicle 10 may be activated is received from the user terminal 20, the remote immobilizer function of the vehicle 10 may be released. The user terminal 20 may ask the user to input a password or a PIN code before sending a reply to the central server 30. As such, it is possible to further increase the security level. Processing from a time at which the user is outside the vehicle 10 to a time at which the user boards the vehicle 10 is the same as that in the first embodiment.

Figure 11:
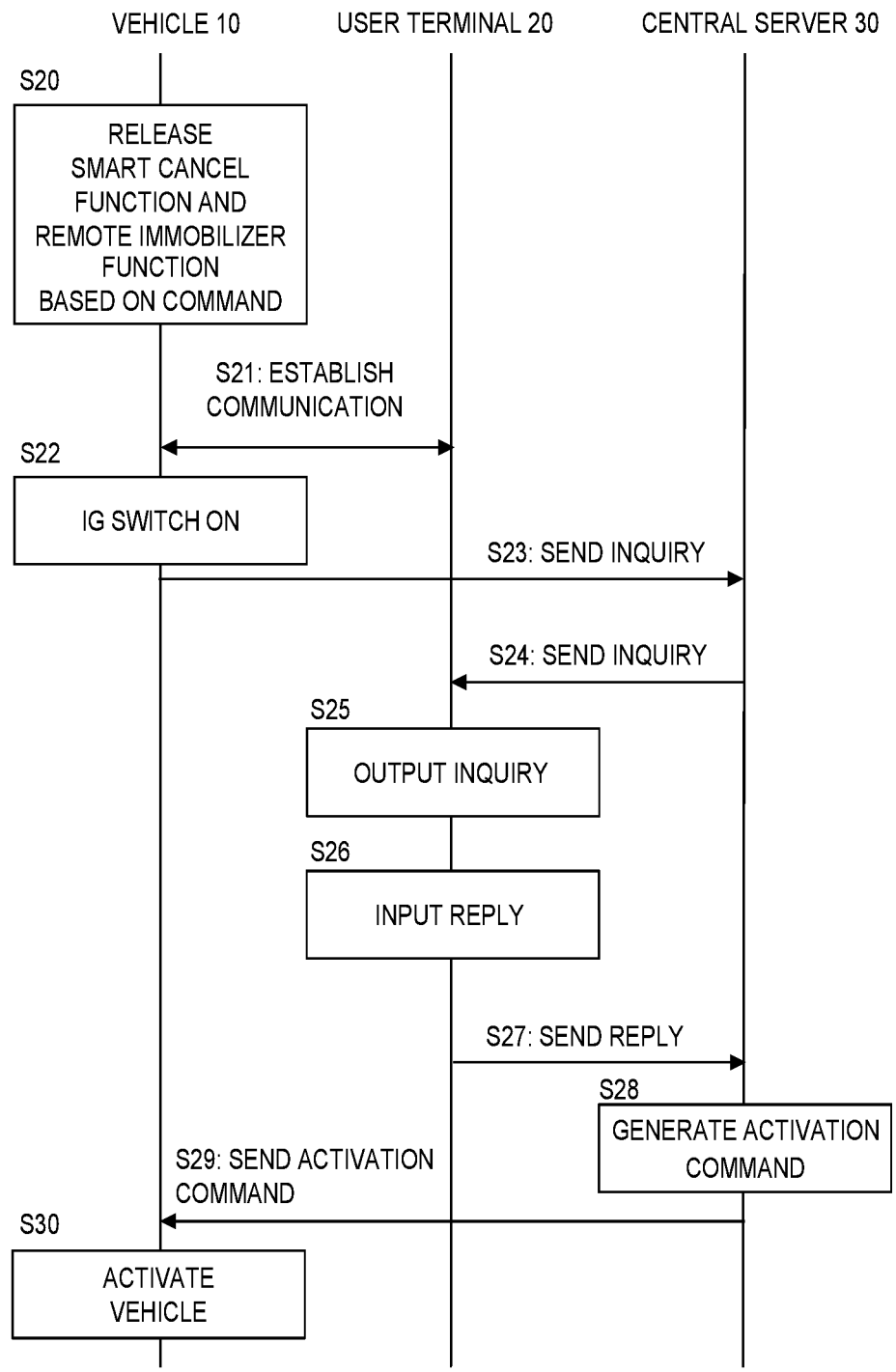
FIG. 11 is a sequence diagram illustrating entire processing of the system according to a second embodiment.

Next, the entire processing of the system 1 will be described. FIG. 11 is a sequence diagram illustrating the entire processing of the system 1. The processing up to S20 is the same as the processing up to S17 in the sequence diagram illustrated in FIG. 7. When the smart cancel function and the remote immobilizer function are released in S20, communication between the vehicle 10 and the user terminal 20 is established (S21). This communication includes a polling signal.

When the user turns on the IG switch 18, in the first embodiment, the vehicle 10 is activated, but in the second embodiment, an inquiry for confirming whether the vehicle 10 may be activated is sent from the vehicle 10 to the central server 30 (S23). Upon receiving the inquiry from the vehicle 10, the central server 30 sends the inquiry for confirming whether the vehicle 10 may be activated to the user terminal 20 (S24). This inquiry includes a command, to the display 25 of the user terminal 20, to display the inquiry for confirming whether the vehicle 10 may be activated and text prompting the user to input a reply.

A screen of the content corresponding to the inquiry is displayed on the display 25 of the user terminal 20 (S25). At this time, for example, together with text, such as "activate the vehicle" and "do not activate the vehicle", a radio button or a slide button used for selecting one of the pieces of the text is displayed and the user is prompted to input.

Then, when the user inputs a reply to the user terminal 20 (S26), the reply is sent to the central server 30 (S27). Upon receiving, from the user terminal 20, a reply indicating that the vehicle 10 is to be activated, the central server 30 generates an activation command, which is a command for activating the vehicle 10 (S28), and sends the activation command to the vehicle 10 (S29). Then, the vehicle 10 that has received the activation command activates the vehicle 10 (S30).

In the description of FIG. 11, the remote immobilizer function is released in S20, but an applicable embodiment of the present disclosure is not limited thereto. For example, when the vehicle 10 receives the activation command sent in S29, the remote immobilizer function may be released. In this case, the command for releasing the remote immobilizer function may be sent before the activation command from the central server 30.

As such, when the vehicle 10 is activated, by confirming whether the vehicle 10 is to be activated to the user terminal 20, it is possible to further prevent the vehicle 10 from being stolen.

Third Embodiment

In the second embodiment, the inquiry is sent from the central server 30 to the user terminal 20, and a command for activating the vehicle 10 is generated according to the reply. However, in the present embodiment, when a predetermined operation is executed on the user terminal 20, the central server 30 activates the vehicle 10 without inquiring of the user terminal 20.

Figure 12:
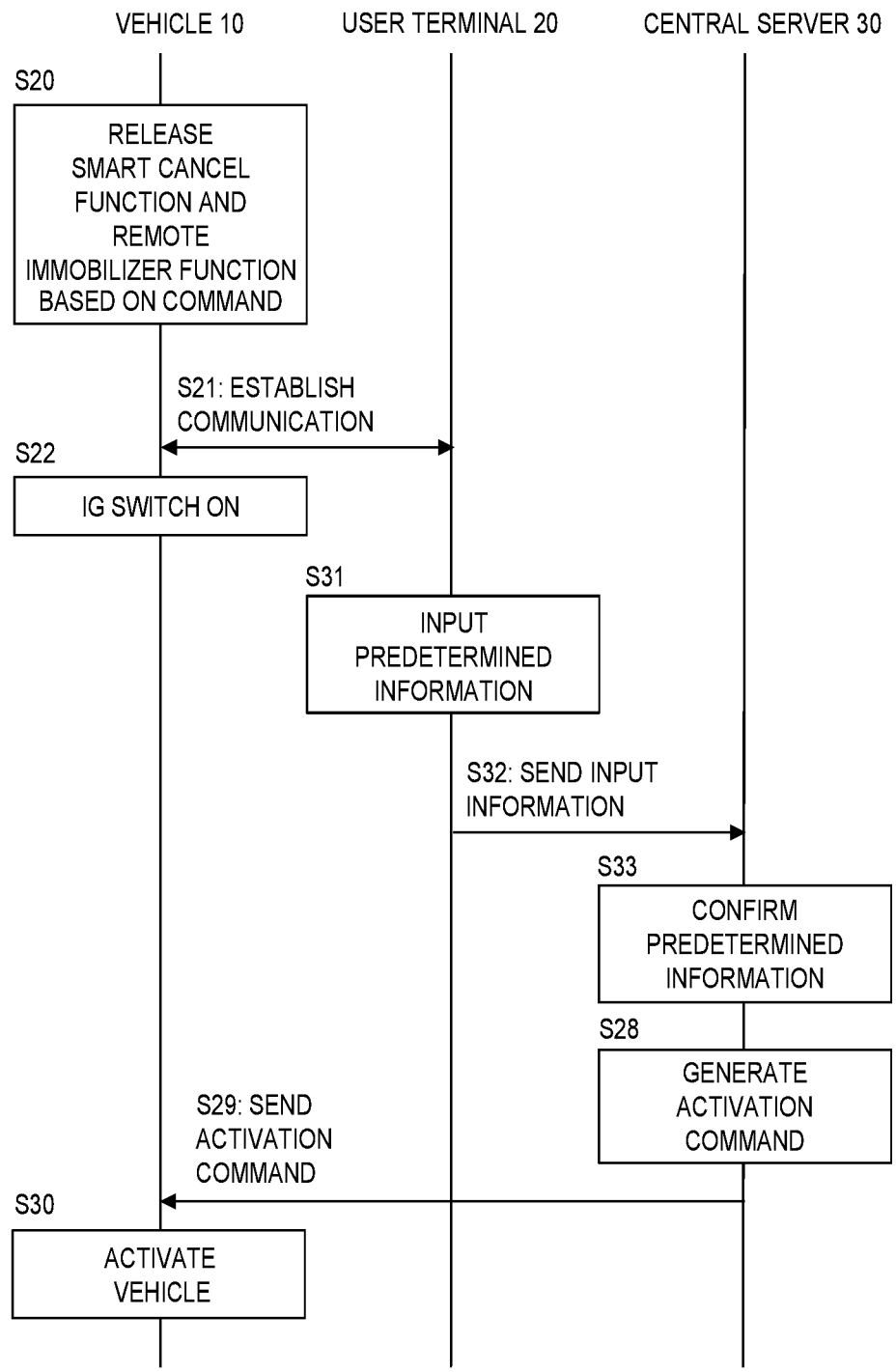
FIG. 12 is a sequence diagram illustrating entire processing of the system according to a third embodiment.

Next, the entire processing of the system 1 will be described. FIG. 12 is a sequence diagram illustrating the entire processing of the system 1. The processing up to S22 is the same as the processing up to S22 in the sequence diagram illustrated in FIG. 11. When the predetermined information is input in S31, the user terminal 20 sends the input information to the central server 30 (S32). Examples of the predetermined information can include a password, a PIN code, and an operation of a predetermined button. The operation of the predetermined button may be executed in an operation order of the predetermined button. The central server 30 that has received the predetermined information confirms whether the predetermined information is legitimate information. For example, legitimate information is stored in advance in the vehicle information DB 311 and checked against the received predetermined information. As a result of the checking, when the predetermined information is the same as the legitimate information, the central server 30 generates the information for activating the vehicle 10 (S28). Since processing after S28 is the same as that in FIG. 11, description thereof will be omitted.

In the description of FIG. 12, the remote immobilizer function is released in S20, but an applicable embodiment of the present disclosure is not limited thereto. For example, when the vehicle 10 receives the activation command sent in S29, the remote immobilizer function may be released. In this case, the command for releasing the remote immobilizer function may be sent before the activation command from the central server 30.

As such, when the vehicle 10 is activated, by activating the vehicle 10 only when predetermined information is input from the user terminal 20, it is possible to further prevent the vehicle 10 from being stolen.

Fourth Embodiment

In the present embodiment, the user terminal 20 and the vehicle 10 are provided with a remote start function for remotely activating the vehicle 10 from the user terminal 20. Other than the above, hardware and software are the same as those in the first embodiment.

For example, when the user operates an engine and an air conditioner in advance before boarding the vehicle 10, it is possible to adjust the temperature inside the vehicle to an appropriate temperature before the user boards the vehicle 10. Further, in a case of an electric vehicle, by operating the air conditioner in advance, it is possible to adjust the temperature inside the vehicle before the user boards it.

Here, when the vehicle 10 is to be remotely activated, it is considered that the vehicle 10 is distanced from the user terminal 20 to some extent. In this case, the remote immobilizer function and the smart cancel function are set. However, when the remote immobilizer function is set, the activation of the vehicle 10 is prohibited. Thus, in the present embodiment, the remote immobilizer function is released before the vehicle 10 is remotely activated. Even when the vehicle 10 is remotely activated, the smart cancel function is not released. As such, it is possible to prevent a third party from invading the vehicle.

Figure 13:
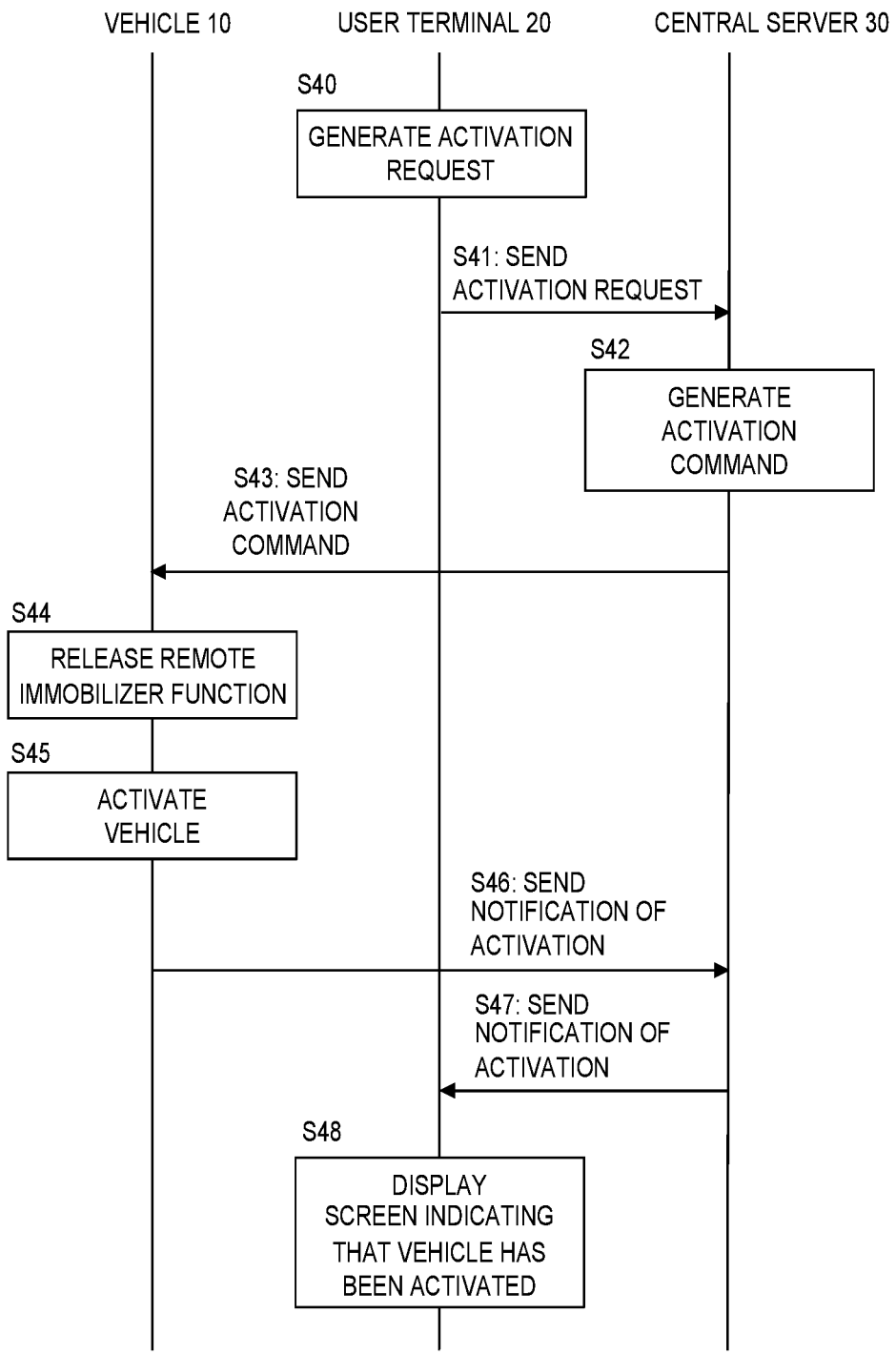
FIG. 13 is a sequence diagram illustrating entire processing of the system according to a fourth embodiment.

Next, the entire processing of the system 1 will be described. FIG. 13 is a sequence diagram illustrating the entire processing of the system 1. The description will be made on the premise that the smart cancel function and the remote immobilizer function have already been set. First, an activation request is generated in the user terminal 20 (S40). The activation request is information for requesting that the vehicle 10 is to be remotely activated. For example, application software for generating an activation request is installed in the user terminal 20, and the activation request is generated when the user activates the application software and executes a predetermined input. The generated activation request is associated with the user terminal ID and sent to the central server 30 (S41). The activation request sent in S41 corresponds to the remote start signal according to the present disclosure.

The central server 30 that has received the activation request identifies the vehicle 10 corresponding to the user terminal 20 and generates an activation command. The activation command is a command for activating the vehicle 10. Upon generating the activation command, the central server 30 sends it to the corresponding vehicle 10 (S43).

In the vehicle 10 that has received the activation command, the remote immobilizer function is released (S44). The smart cancel function is maintained in the set state. Then, the control unit 101 of the vehicle 10 activates the vehicle 10. When the vehicle 10 is activated, a notification of the fact that the vehicle 10 has been activated is sent from the vehicle 10 to the central server 30 (S46). The notification is further sent from the central server 30 to the user terminal 20 (S47). A screen indicating that the vehicle 10 has been activated is displayed on the display 25 of the user terminal 20 that has received the notification (S48).

Thereafter, for example, when the distance between the vehicle 10 and the user terminal 20 is shorter than the first predetermined distance, the smart cancel function is released.

As such, when remotely activating the vehicle 10, by remotely releasing the remote immobilizer function, it is possible to activate the vehicle 10 even when the user terminal 20 is distanced from the vehicle 10. Further, at this time, since the smart cancel function is set, it is possible to prevent a third party from invading the vehicle 10.

Other Embodiments

The embodiments are merely examples, and the present disclosure can be appropriately modified and implemented without departing from the scope thereof.

The processes and elements described in the present disclosure can be freely combined and implemented as long as no technical contradiction arises.

Further, the processing described as being executed by one device may be executed in a shared manner by a plurality of devices. Alternatively, the processing described as being executed by different devices may be executed by one device. In the computer system, the hardware configuration (the server configuration) that implements each function can be flexibly changed. For example, the vehicle 10 may have a part or all of the functions of the central server 30.

The present disclosure can also be implemented by supplying a computer with a computer program that implements the functions described in the above embodiments and modified examples, and reading and executing the program by one or more processors included in the computer. Such a computer program may be provided to a computer by a non-transitory computer-readable storage medium that can be connected to a system bus of the computer, or may be provided to the computer via a network. Examples of the non-transitory computer-readable storage medium include any kind of disk, such as a magnetic disk (a floppy® disk, an HDD, and the like), an optical disk (a CD-ROM, a DVD disk, a Blu-ray disc, and the like), a ROM, a RAM, an EPROM, an EEPROM, a magnetic card, a flash memory, an optical card, and any kind of medium suitable for storing electronic commands.

What is claimed is:

1. An information processing apparatus comprising:
a control unit programmed to:
acquire a distance between a vehicle and a user terminal based on position information of the vehicle and position information of the user terminal;
when the distance between the vehicle and the user terminal is shorter than a first predetermined distance, release a remote immobilizer function and a smart cancel function,
when the distance between the vehicle and the user terminal is equal to or longer than a second predetermined distance, which is shorter than the first predetermined distance, release the smart cancel function and set the remote immobilizer function, and
when the distance between the vehicle and the user terminal is shorter than the second predetermined distance, release the smart cancel function and the remote immobilizer function, wherein
the remote immobilizer function is a function for remotely setting or releasing an immobilizer of the vehicle, and the smart cancel function is a function for stopping radio waves transmitted from the vehicle for communication between the vehicle and a key of the vehicle.

2. The information processing apparatus according to claim 1, wherein the control unit is programmed, upon receiving a remote starting signal from the user terminal when the remote immobilizer function and the smart cancel function are set, to release the remote immobilizer function to activate the vehicle and not to release the smart cancel function, the remote starting signal being a command for activating the vehicle.

3. The information processing apparatus according to claim 1, wherein the control unit is programmed to:
inquire of the user terminal as to whether to activate the vehicle when an operation for activating the vehicle is executed on the vehicle; and
generate a command for activating the vehicle when there is a reply from the user terminal indicating that the vehicle is to be activated.

4. The information processing apparatus according to claim 1, wherein the control unit is programmed to, when there is a predetermined input to the user terminal, generate the command for activating the vehicle.

5. An information processing method executed by a computer, the information processing method comprising:
acquiring, by the computer, a distance between a vehicle and a user terminal based on position information of the vehicle and position information of the user terminal;
when the distance between the vehicle and the user terminal is equal to or longer than a first predetermined distance, setting, by the computer, a remote immobilizer function and a smart cancel function,
when the distance between the vehicle and the user terminal is shorter than the first predetermined distance, releasing, by the computer, the remote immobilizer function and the smart cancel function,
when the distance between the vehicle and the user terminal is equal to or longer than a second predetermined distance and shorter than the first predetermined distance, releasing the smart cancel function and setting the remote immobilizer function, by the computer, and
when the distance between the vehicle and the user terminal is shorter than the second predetermined distance, releasing the smart cancel function and the remote immobilizer function by the computer,
wherein the remote immobilizer function is a function for remotely setting or releasing an immobilizer of the vehicle, and the smart cancel function is a function for stopping radio waves transmitted from the vehicle for communication between the vehicle and a key of the vehicle.

6. The information processing method according to claim 5, wherein the remote immobilizer function is released to activate the vehicle and the smart cancel function is not released by the computer when the remote immobilizer function and the smart cancel function are set and a remote starting signal is received from the user terminal, the remote starting signal being a command for activating the vehicle.

7. The information processing method according to claim 5, wherein the user terminal is inquired by the computer as to whether to start the vehicle when an operation for activating the vehicle is executed on the vehicle, and a command for activating the vehicle is generated by the computer when there is a reply from the user terminal indicating that the vehicle is to be activated.

8. The information processing method according to claim 5, wherein the command for activating the vehicle is generated by the computer when there is a predetermined input to the user terminal.

9. A system comprising:
a vehicle configured to send position information; and
a central server configured to, when a distance between the vehicle and a user terminal is equal to or longer than a first predetermined distance, set a remote immobilizer function and a smart cancel function, wherein the central server is configured to, when the distance between the vehicle and the user terminal is equal to or longer than a second predetermined distance and shorter than the first predetermined distance, release the smart cancel function and set the remote immobilizer function, and wherein the central server is configured to, when the distance between the vehicle and the user terminal is shorter than the second predetermined distance, release the smart cancel function and the remote immobilizer function, wherein the remote immobilizer function is a function for remotely setting or releasing an immobilizer of the vehicle, and the smart cancel function is a function for stopping radio waves transmitted from the vehicle for communication between the vehicle and a key of the vehicle.

* * * * *